United States Patent [19]

Khuntia et al.

[11] 4,169,524

[45] Oct. 2, 1979

[54] DISC BRAKE SERVICE PISTON RETURN SPRING GUIDE PIN REMOVAL

[75] Inventors: Natabara Khuntia, Hudson; Charles W. Rader, Willowick, both of Ohio

[73] Assignee: General Motors Corporation, Detroit, Mich.

[21] Appl. No.: 920,264

[22] Filed: Jun. 29, 1978

[51] Int. Cl.² ............................................. F16D 55/40
[52] U.S. Cl. .................................. 188/170; 188/2 R; 188/72.3
[58] Field of Search .................... 188/1 R, 2 R, 18 A, 188/72.3, 72.4, 170, 216; 192/4 R

[56] References Cited

U.S. PATENT DOCUMENTS 3,301,359   1/1967   Cole et al. ............................ 192/4 R Primary Examiner—Duane A. Reger
Attorney, Agent, or Firm—D. D. McGraw

[57] ABSTRACT

A disc brake service piston for heavy equipment and off-the-road vehicles has an annular configuration and is sealingly and reciprocably received in an annular cavity forming a pressure chamber. During brake disassembly requiring removal of the piston from the cavity, the piston must be disconnected from a series of piston retracting mechanisms. The arrangement permits the force of one piston retraction spring to be relieved at a time. A tool is used which has a thread at one end and a handle at the other end. The threaded end is inserted into a tapped hole at the end of a return spring guide pin which transmits the spring force of one retracting mechanism to the piston. The tool can then be moved to compress the guide pin spring so that the pin is moved a sufficient distance to expose a cross pin therein which provides the connection between the guide pin and the piston. The cross pins are removed, one by one, from all of the spring guide pins of all of the mechanisms. The only manual force required at any one time in such removal is that required to overcome the compression force of one piston return spring. After all of the pins are removed, the piston can then be easily pulled out of the annular pressure chamber cavity.

1 Claim, 4 Drawing Figures

DISC BRAKE SERVICE PISTON RETURN SPRING GUIDE PIN REMOVAL

The invention relates to an arrangement permitting the removal of a series of service piston return spring guide pins while requiring sufficient force at any one time to compress only one of a series of return springs.

In the prior art relating to brakes of this type, after the brake has been disassembled and the service piston is to be removed, a series of circumferentially spaced tapped holes are provided in the service piston in which jack bolts may be disposed. The piston is then pulled outwardly, compressing all of the piston return springs at the same time. The return spring guide pins transmit the force on the piston to the springs through cross pins extending through the guide pins and located in stepped holes in the piston. Another cross passage is provided in each of the guide pins in spaced relation to the one through which each installed cross pin extends. A second cross pin is then inserted in the other holes after the springs have been sufficiently compressed to expose these other holes. The second cross pins then hold the guide pins in their withdrawn position, keeping the return springs compressed, the piston is then moved back to its released position, sliding relative to the guide pins. This exposes the first cross pins which are then removed. After removal of all of these cross pins, the piston is removed from the annular chamber and the guide pins. This arrangement is disclosed and described in U.S. Pat. No. 3,301,359.

By arranging to compress only one piston return spring at a time, the disassembly of a brake of this type is more easily accomplished in the field, particularly where it is difficult or awkward to install jack bolts and exert a force sufficient to overcome all of the piston return springs at once. Also, when utilizing the invention herein disclosed and claimed, no extra set of cross pins need be provided. The repairman does not have to perform the step of inserting an extra set of cross pins. The invention permits the repairman to disassemble the brake more quickly, with less tools and less effort.

IN THE DRAWINGS

Figure 4:
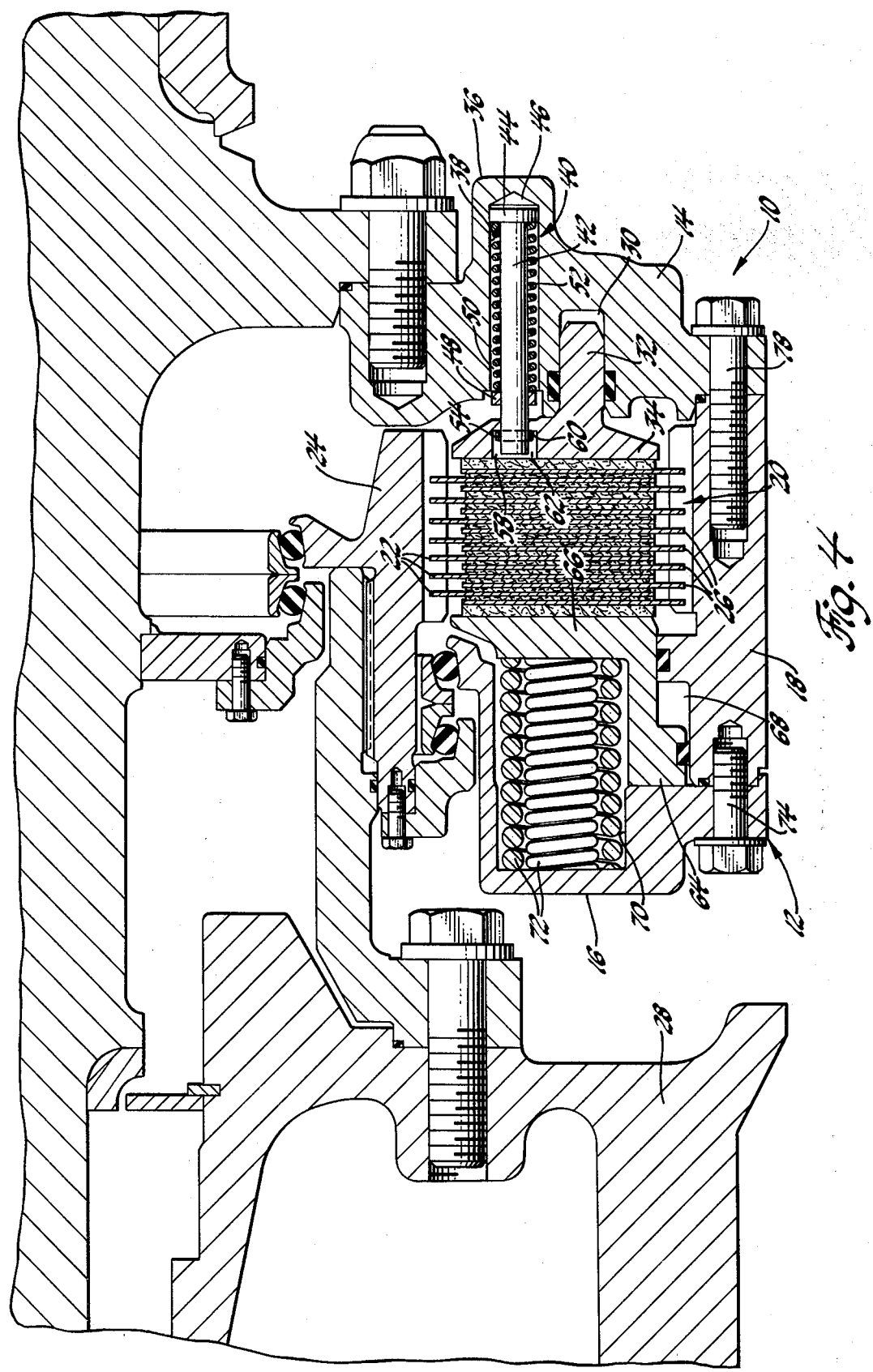
FIG. 4 is a cross section view of the brake assembly of FIG. 1 showing the brake assembly in the assembled condition with the service brake and the parking brake released.

The disc brake assembly 10 is of the heavy duty type commonly used in industrial vehicles, and particularly off-the-road vehicles. The assembly includes a housing 12 assembled from several housing sections. As better seen in FIG. 4, the housing includes housing sections 14, 16 and 18. The brake assembly includes a disc pack 20 formed of interleaved plates with one set of plates 22 being splined on a rotatable support member 24 and the other set of plates 26 being splined to housing section 18. Support member 24 is arranged to rotate with the wheel 28 to be braked. The housing 12 is attached to a fixed portion of the vehicle.

Housing section 14 has an annular pressure chamber 30 formed therein and opening toward housing section 16. An annular piston 32 is reciprocably received in chamber 30 to define therewith a cavity for introduction of pressurized fluid to actuate the brake. Piston 32 has a plate engaging section 34 and is arranged so that when the piston is actuated the disc pack 20 will be subjected to brake actuating force. A series of bosses 36 is provided on housing section 14 and each boss is formed with a bore 38 opening toward the disc pack 20. A piston retracting mechanism 40 is provided inside each bore 38. This mechanism includes a return spring guide pin 42 having a head 44 reciprocably movable in the bore end 46, a bore cover 48 covering the open end 50 of bore 38 and suitably secured to housing section 14, and a piston return spring 52 which is a compression spring receiving pin 42 therethrough. One end of spring 52 engages pin head 44 and the other end engages the bore cover 48 so that the spring continually urges the pin toward bore end 46. The retracting mechanism 40 also includes a cross pin 54, which is longer than the diameter of pin 42 and extends through a cross passage 56 formed near the opposite end of the pin 42 from pin head 44. The end of the pin 42 containing passage 56 extends through a stepped hole 58 formed in a part of piston 32 and having a shoulder 60 facing the disc pack 20. The cross pin 54 is contained within the enlarged portion 62 of hole 58 and engages shoulder 60 so that the retracting force of spring 52 is exerted on piston 32 and tends to move the piston in the retracting direction to disengage the disc pack 20. It can be seen that when brake actuating pressure in chamber 30 is released, the force of all of the springs 52 in all of the bores 38 will move piston 32 away from the disc pack, releasing the brake. The piston is returned to its retracted position in which it engages a part of housing section 14.

Housing section 16 has an annular brake apply piston 64 reciprocably received therein. The piston has a plate engaging section 66 which is on the opposite side of the disc pack 20 from the plate engaging section 34 of piston 32. Piston 64 and housing section 18 are constructed and arranged to define therebetween a pressure chamber 68 which when pressurized will permit pressure to act on piston 64 to move the piston in a brake releasing direction. A series of cylinder 70 formed in housing section 16 contains brake apply springs 72. As illustrated, each cylinder 70 has two such brake apply springs. The springs engage housing section 16 in cylinder 70 and also act on the back side of the plate engaging section 66 of piston 64 to urge that piston toward brake actuating relation with disc pack 20. Housing section 16 is secured to housing section 18 by a series of bolts 74. Bolts 78 are similar to bolts 74 and attach housing section 14 to housing section 18.

During normal brake operation, with the vehicle running, pressure is maintained in chamber 68 to hold off the parking brake mechanism by moving piston 64 against housing section 16 and compressing the parking brake apply spring 72. The service brakes are actuated by delivering fluid pressure to service brake chamber 30 to move the service piston 32 and compress the disc pack 20 against the plate engaging section 66 of piston 64. Brake actuation causes compression of springs 52 of retracting mechanisms 40. Upon release of the service brake pressure in chamber 30, springs 52 return service piston 32 to the brake released position. When the vehicle is to be parked, the pressure in chamber 68 is released and springs 72 move piston 64 to compress the disc pack 20 against the plate engaging section 34 of piston 32. Piston 32 under these conditions is grounded against housing section 14 so that it provides a suitable reaction plate for parking purposes.

Figure 1:
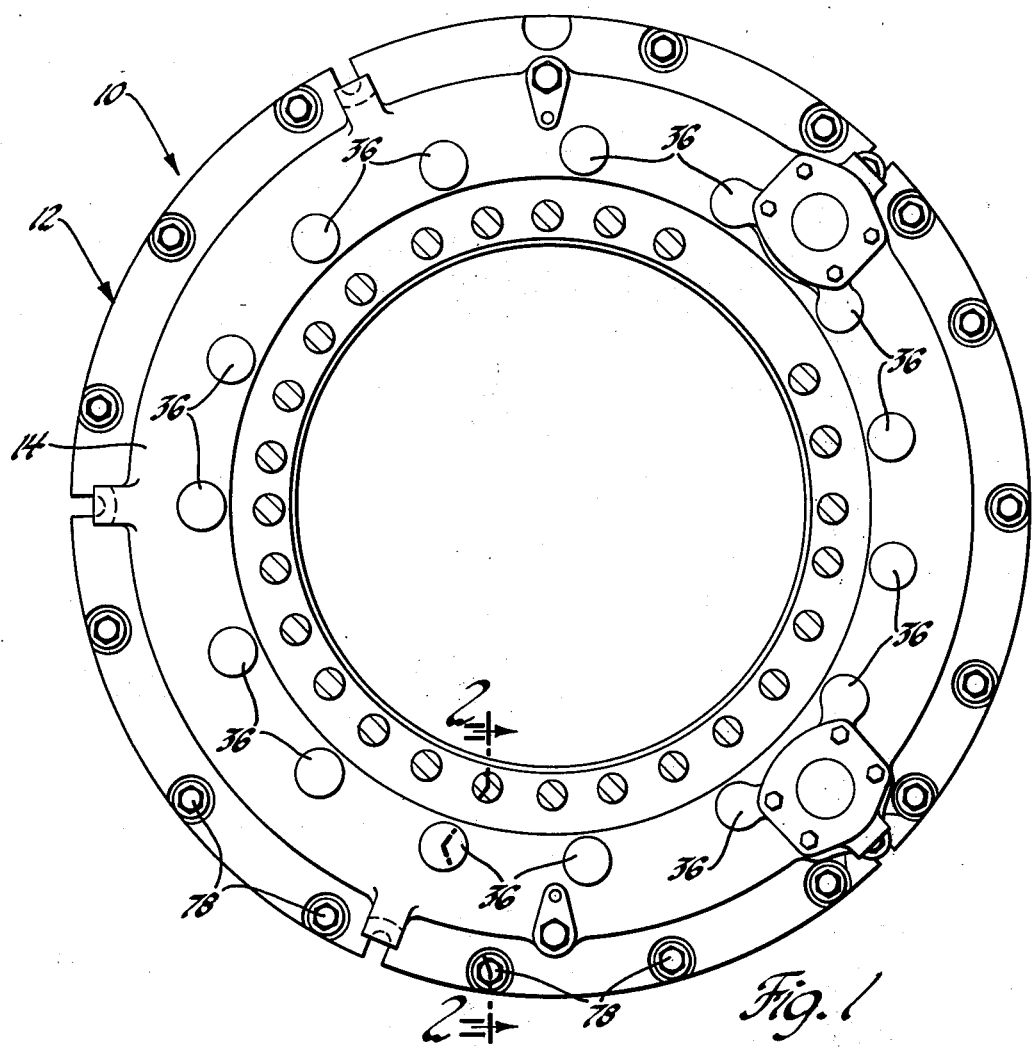
FIG. 1 is an elevation view of a disc brake assembly embodying the invention.
Figures 2, 3:
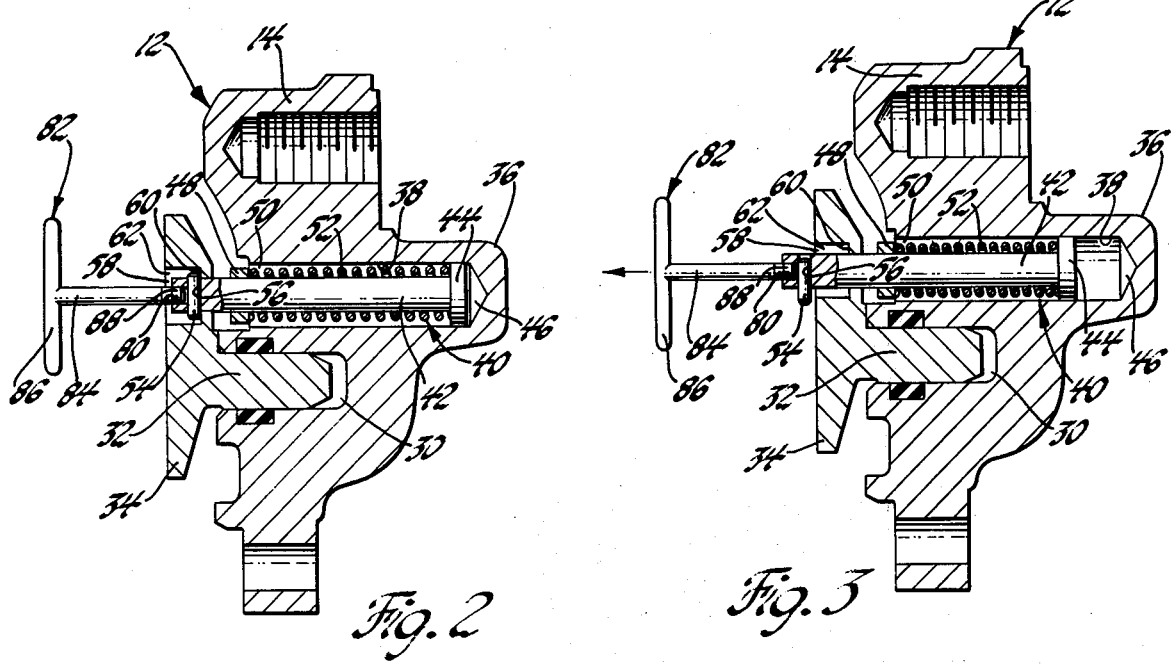
FIG. 2 is a cross section view taken through a portion of the brake assembly of FIG. 1 in the direction of arrows 2—2 and showing the removal tool in position to initiate removal of the cross pin.
FIG. 3 is similar to FIG. 2 with the removal tool having sufficient force exerted thereon to compress the piston return spring sufficiently to permit the cross pin to be removed. The cross pin is illustrated in the partially removed position.

The end of pin 42 near which cross passage 56 is formed is provided with a tapped hole 80 extending axially into the end of pin 42. With plate engaging section 34 of piston 32 accessible by prior partial disassembly of the brake, tool 82 is used. The tool may be a relatively simple hand tool such as that illustrated and comprising a shank 84 with the handle 86 on one end and threads 88 on the other end. The tool threaded end is threaded into tapped hole 80 a sufficient distance to mount the tool in the position shown. If hole 80 extends to cross passage 56, the tool is not threaded into hole 80 sufficiently to engage cross pin 54. The repairman then exerts an axial force on the tool 82 which is sufficient to compress piston return spring 52. In a typical installation this may be approximately 80 pounds of force. When the pin 42 is moved axially from the position shown in FIG. 2 to the position shown in FIG. 3, cross pin 54 is clear of stepped hole 58 and is removed from cross passage 56. The force exerted by the repairman on tool 82 is then relaxed, allowing pin 42 to return to the position shown in FIG. 2, but without cross pin 54 in place. Tool 82 is then removed and the same procedure is performed with each of the retracting mechanisms in turn until all of the cross pins have been removed from all of the guide pins. Piston 32 can then be removed from the annular pressure chamber 30.

In the particular brake illustrated, there are 15 sets of bosses 36 with piston retracting mechanisms 40 therein. In removing the piston in accordance with the prior art noted, a force would have to be exerted which is approximately 15 times as great as the force required by practicing the invention herein claimed. Thus, instead of having to generate a force of 1200 pounds in the field, the repairman only has to generate a force of 80 pounds at a time.

What is claimed is:

1. In a disc brake having a housing, an annular pressure chamber formed in said housing, circumferentially spaced bores for piston retracting mechanisms formed in said housing, an annular piston sealingly and reciprocably mounted in said annular pressure chamber for brake actuation by pressure introduced into said chamber, said piston having circumferentially spaced stepped holes in axial alignment with said circumferentially spaced bores and having shoulders therein, and piston retracting mechanisms in each of said bores and holes, each of said piston retracting mechanisms including a return spring guide pin having a head on one end in one end of one of said bores, a compression piston return spring having one end engaging said guide pin head and the other end engaging a bore cover secured to said housing, said guide pin extending into one of said piston circumferentially spaced stepped holes, the improvement comprising:

a tapped hole extending axially in the other end of said return spring guide pin, a single cross passage extending through said guide pin adjacent to said tapped hole and located in said piston stepped hole, and a cross pin in said cross passage of greater length than the diameter of said guide pin and normally engaging said shoulder of said stepped hole and transferring piston retracting force exerted by said spring to urge retraction of said piston and for preventing the removal thereof from said annular chamber, and removal tool means having an attachment portion selectively threadable into one of said tapped holes and a force imparting portion for exerting an axial force on one of said guide pins at a time to compress said piston return spring sufficiently to expose said cross pin by extending it axially out of said stepped hole so that the cross pin can be removed, said selectively threaded means then being movable to each of said retracting mechanisms in turn until all of said cross pins have been removed from said spring guide pins, after which said piston can be removed from said annular chamber.

* * * * *